United States Patent
Requate et al.

(10) Patent No.: US 11,274,780 B2
(45) Date of Patent: Mar. 15, 2022

(54) PROTECTIVE DEVICE FOR A HOSE CLIP

(71) Applicant: Sartorius Stedim Biotech GmbH, Goettingen (DE)

(72) Inventors: Wilhelm Requate, Heiligenstadt (DE); Andre Dell, Gieboldehausen (DE); Thomas Loewe, Goettingen (DE); Johannes Wortmeyer, Goettingen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 689 days.

(21) Appl. No.: 15/778,281

(22) PCT Filed: Nov. 24, 2016

(86) PCT No.: PCT/EP2016/078649
§ 371 (c)(1),
(2) Date: May 23, 2018

(87) PCT Pub. No.: WO2017/089450
PCT Pub. Date: Jun. 1, 2017

(65) Prior Publication Data
US 2018/0340639 A1   Nov. 29, 2018

(30) Foreign Application Priority Data
Nov. 26, 2015 (DE) ................ 10 2015 120 561.0

(51) Int. Cl.
*F16L 33/02* (2006.01)
*F16L 33/025* (2006.01)
*F16L 35/00* (2006.01)

(52) U.S. Cl.
CPC ............ *F16L 33/02* (2013.01); *F16L 33/025* (2013.01); *F16L 35/00* (2013.01)

(58) Field of Classification Search
CPC ......... F16L 33/02; F16L 33/025; F16L 35/00; F16L 21/06; F16L 55/1705
(Continued)

(56) References Cited

U.S. PATENT DOCUMENTS 2,614,304 A    10/1952   Oetiker
4,615,543 A *  10/1986   Cannon ................. F16L 35/00
                                              285/45

(Continued)

FOREIGN PATENT DOCUMENTS

AU    199856334    8/1998
CN    101300444    11/2008
(Continued)

OTHER PUBLICATIONS

International Search Report dated Feb. 22, 2017.
(Continued)

*Primary Examiner* — Zachary T Dragicevich
(74) *Attorney, Agent, or Firm* — Gerald E. Hespos; Matthew T. Hespos; Michael J. Porco (57) ABSTRACT

A protective device (5, 5", 5''', 5'''', 5''''') is provided for a hose clip (4) that connects a hose end (2) to a hose connection (3). The protective device includes a protective body (8, 8', 8'', 8''', 8'''') made of a plastic. In the assembled state, the protective body (8, 8', 8'', 8''', 8'''') surrounds the circumference of the hose clip (4) and accommodates the hose clip (4) at least in its clamping region via a radially oriented molding (32), and covers the hose clip (4) over the width thereof extending in the longitudinal direction of the hose connection (3). The protective body (8, 8', 8'', 8''', 8'''') has ring segments (9, 10) that can be connected to one another at their free ends (12, 13), and the segments are connected moveably to one another at their ends (14, 17) facing away from the free ends (12, 13).

5 Claims, 7 Drawing Sheets

(58) Field of Classification Search
USPC .......................................................... 285/45
See application file for complete search history.

(56) References Cited

U.S. PATENT DOCUMENTS

| | | | |
|---|---|---|---|
| 4,826,215 A | | 5/1989 | Sullivan |
| 4,858,960 A | * | 8/1989 | Pharaon .................. F16L 35/00 |
| 5,460,540 A | | 10/1995 | Reichle |
| 5,853,200 A | * | 12/1998 | Zieres ..................... F16L 35/00 |
| | | | 285/45 |
| 5,895,076 A | * | 4/1999 | Elliott ..................... F16L 35/00 |
| | | | 285/45 |
| 6,155,610 A | * | 12/2000 | Godeau .................. F16L 33/02 |
| 6,247,206 B1 | | 6/2001 | Craig, Jr. |
| 9,634,475 B2 | * | 4/2017 | Mason |
| 2009/0158559 A1 | | 6/2009 | Chardon et al. |
| 2011/0163537 A1 | | 7/2011 | Baggenstos et al. |
| 2016/0123518 A1 | * | 5/2016 | Stoltzfus ................. F16L 35/00 |
| | | | 285/45 |
| 2016/0146386 A1 | | 5/2016 | Blake et al. |

FOREIGN PATENT DOCUMENTS

| | | |
|---|---|---|
| DE | 600 19 108 | 3/2006 |
| EP | 0 603 846 | 6/1994 |
| EP | 2 341 273 | 7/2011 |
| FR | 3 007 813 | 1/2015 |

OTHER PUBLICATIONS

Translation of International Preliminary Report on Patentability for International Application No. PCT/EP2016/078649 dated May 29, 2018.

* cited by examiner

PROTECTIVE DEVICE FOR A HOSE CLIP

BACKGROUND

Field of the Invention

The invention relates to a protective device for a hose clip, via which a hose end can be connected to a hose connection, comprising a protective body made of a plastic, wherein in the assembled state, the protective body surrounds the hose clip around the circumference thereof and accommodates same at least in its clamping region via a radially oriented moulding, and covers the hose clip over the width thereof extending in the longitudinal direction of the hose connection.

Description of the Related Art

A protective device for a hose clip to connect a hose end to a hose connection is known from AU 199 856 334 B2. The protective device has a protective body made of a plastic that surrounds the hose clip around the circumference thereof and it has a radially oriented moulding that accommodates the clamping region of the hose clip and prevents displacement of the protective device of the assembled protective body in the longitudinal direction of the hose connection.

It is disadvantageous that, in order to facilitate assembly, the circumferential area of the protective body has to have relatively high elasticity, while in the area of the moulding the protective body has to have relatively high stiffness in order to perform its protective function. Consequently, it is proposed therein to manufacture the protective body from two different plastics, which results in undesirably high manufacturing costs.

Also from AU 199 856 334 B2 another protective body is known that is made of plastic and has a cap-shaped recess in the clamping region of the hose clip, which recess transitions into two lateral strip-shaped ends that surround the hose clip in a clamping manner over a portion of its circumference.

It is disadvantageous in this second solution that the region of the protective body facing away from the clamping region must be open for assembly purposes and cannot encircle the protective clip around the circumference thereof.

Finally, a protective body made of a semi-rigid plastic that has a radially oriented cap-shaped or dome-shaped moulding to accommodate the clamping region of the hose clip is known from AU 199 856 334 B2. The dome-shaped moulding is arranged at one end of a strip-shaped band. At its end facing away from the moulding the band has an opening with which the end of the band may be pulled over the clamping region and wound around the circumference of the protective clip, and the end containing the moulding is likewise pulled over the clamping region.

The disadvantage of this is that the band of the protective body requires a relative amount of flexibility in order for it to be placed or wound around the hose clip. In order to achieve the required stiffness in the moulding region, a reinforcement rib must be additionally arranged there.

Furthermore, hose clips are known from U.S. Pat. No. 2,614,304 A and from DE 600 19 108 T2 the clamping region of which takes the form of an outwardly directed, plastically deformable ear (loop) with outwardly extending leg sections, which are connected to one another via a bridge section that runs essentially in the circumferential direction transversely with respect to the longitudinal direction of the hose connection, and which are plastically deformed to create the ear for clamping the hose clip. Such hose clips, which have generally proven effective in particular for hose couplings with high pressures, nevertheless have the disadvantage that, in the case of sterile-packaged disposable products with hose connections, the sterile packages can be damaged by the hose clips.

The present invention seeks to solve the problem of improving the known protective devices in such a manner that they can be manufactured from a plastic having sufficient strength to improve their protective function. At the same time, the protective devices should be easily and safely installable.

SUMMARY

The invention relates to a protective device for a hose clip, via which a hose end can be connected to a hose connection. The protective device includes a protective body made of a plastic. In an assembled state, the protective body surrounds the hose clip around the circumference thereof and accommodates the hose clip at least in its clamping region via a radially oriented moulding, and covers the hose clip over the width thereof extending in the longitudinal direction of the hose connection. The protective body has at least two ring segments that can be connected to one another at their free ends that are facing one another, and that are movably connected to one another at their ends that are facing away from the free ends.

Due to the hinge-like connection of the ring segments, they can be outwardly or inwardly folded, transversely with respect to the longitudinal axis of the hose connection, and they are accordingly detachably or non-detachably connectable to one another at their free ends. Due to the hinge-like connection, the ring segments can have a relatively high stiffness, which correlates to the protective function. The risk of any damage to a sterile package is substantially reduced by appropriate configuration of the protective body with round edges and without sharp corners.

In a preferred embodiment of the invention, the free ends of the ring segments are connectable to one another via a catch mechanism. The catch mechanism makes possible an easy and fast assembly of the protective body. At the same time, the protective device, together with the protective body, can easily be removed and, if appropriate, reused.

At their articulated ends facing away from the free ends the ring segments are flexibly linked to an adjacent ring segment. The adjacent ring segment can in this case be an intermediate segment that connects the two ring segments to one another. In this respect, the protective body can be formed from three ring segments.

The segments may be linked via a flexible thin section. The design of the link as a thin section provides greater flexibility in relation to the ring segments.

According to one embodiment, the protective body has, at least on the side thereof that is facing away from the hose connection, a kink protection configured as an overlapping element to accommodate a portion of the hose. The kink protection reliably prevents a possible kinking of the hose precisely in the transition region between hose connection and hose end. It is necessary to prevent a kinking of the hose because of an associated unwanted change in flow rate.

The kink protection may comprise a cone tapered in the direction facing away from the protective body. The conical design of the kink protection increases the flexibility in keeping with the decreasing wall thickness, which at the same time reduces the risk of kinking in the hose at the end of the kink protection.

The kink protection may comprise a coil directed away from the protective body. The coil also prevents an unwanted kinking, but enables a certain curvature of the hose.

The kink protection may comprise a cylinder directed away from the protective body. The cylinder may have radially inward-directed annular ribs. Because the ribs are inward-directed, dirt from outside also is prevented from getting in. The annular intermediate spaces that are delimited laterally by the ribs create thin sections arranged between the individual ribs. The thin sections on the one hand increase the flexibility of the kink protection and on the other hand prevent excessive kinking by virtue of the free ends of the ribs abutting against one another.

It is also possible to configure the kink protection as a cylinder directed away from the protective body and having radially outward-directed annular ribs.

Additional features and advantages of the invention are evident from the following detailed description and the drawings.

DETAILED DESCRIPTION

Figure 1:
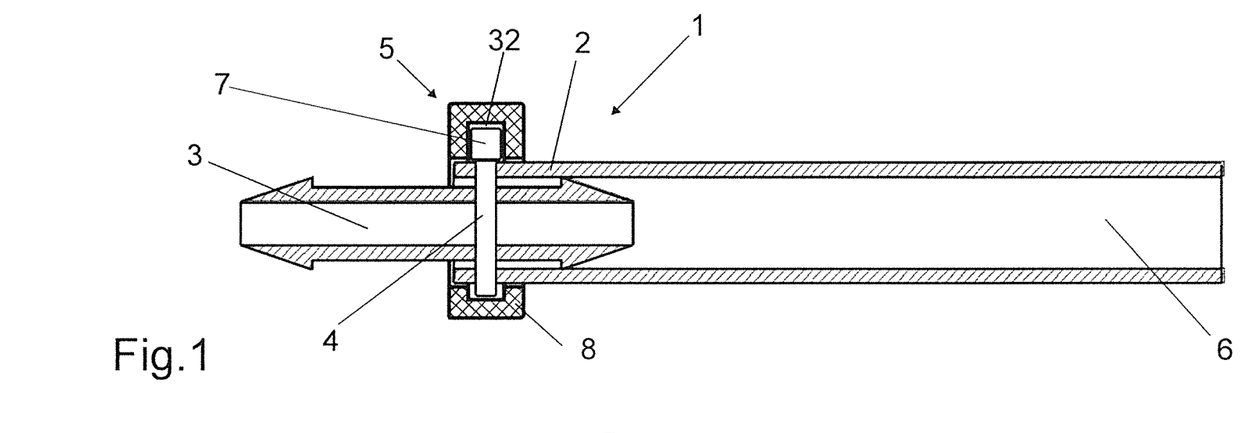
FIG. 1 a sectional side view of a hose coupling with a hose clip (uncut) and a protective device, FIG. 2 a side view of the hose coupling of FIG. 1 with a protective device and a hose clip indicated by broken lines, FIG. 3 a three-dimensional view of the folded open protective device of FIG. 1, FIG. 4 a three-dimensional view of the protective device of FIG. 1 in the folded open state with a hose clip interposed therein and a hose end indicated by broken lines, FIG. 5 a sectional side view of a hose coupling with a hose clip (uncut) and a protective device with kink protection and cone, FIG. 6 a sectional side view of a hose coupling with a hose clip (uncut) and a protective device with a coil as kink protection (uncut), FIG. 7 a sectional side view of a hose coupling with a hose clip (uncut) and a protective device with kink protection in the form of a cylinder with radially inward-directed annular ribs, FIG. 8 a sectional side view of a hose coupling with a hose clip (uncut) having a protective body with kink protection in the form of a cylinder with radially outward-directed ribs, FIG. 9 a side view of a hose coupling with a hose connection, hose end and hose clip, FIG. 10 a side view of the hose coupling of FIG. 9 with an installed protective device, FIG. 11 a three-dimensional view of the protective device of FIG. 10 with a folded open protective body, FIG. 12 another three-dimensional view of the protective device of FIG. 10 with a folded open protective body, FIG. 13 a side view of the protective body of FIG. 12 from direction XIII and FIG. 14 a top view of the protective device of FIG. 13 from direction XIV.
Figure 2:
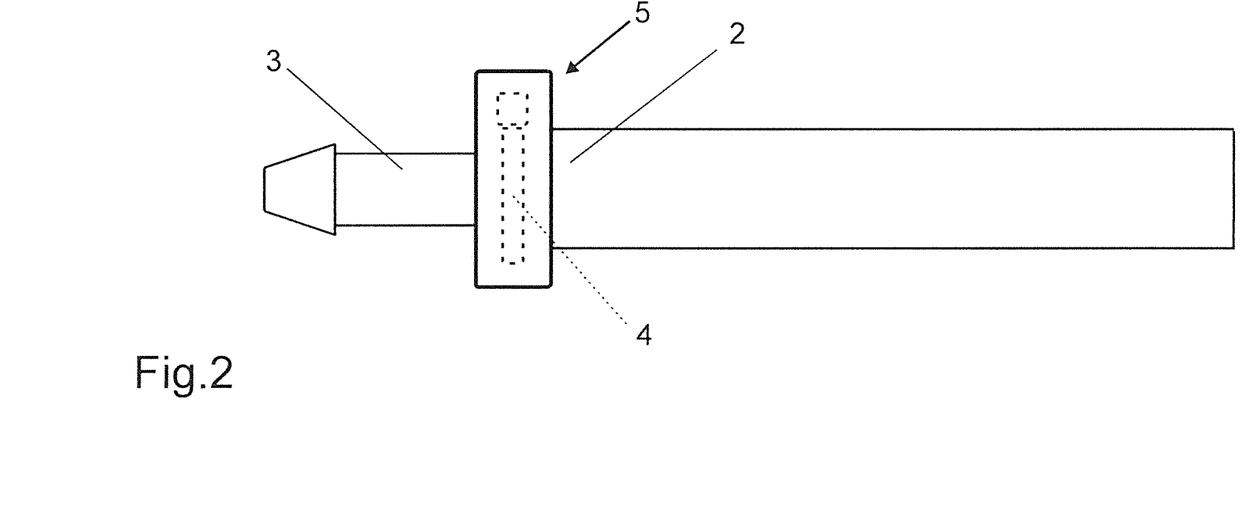
Figure 9:
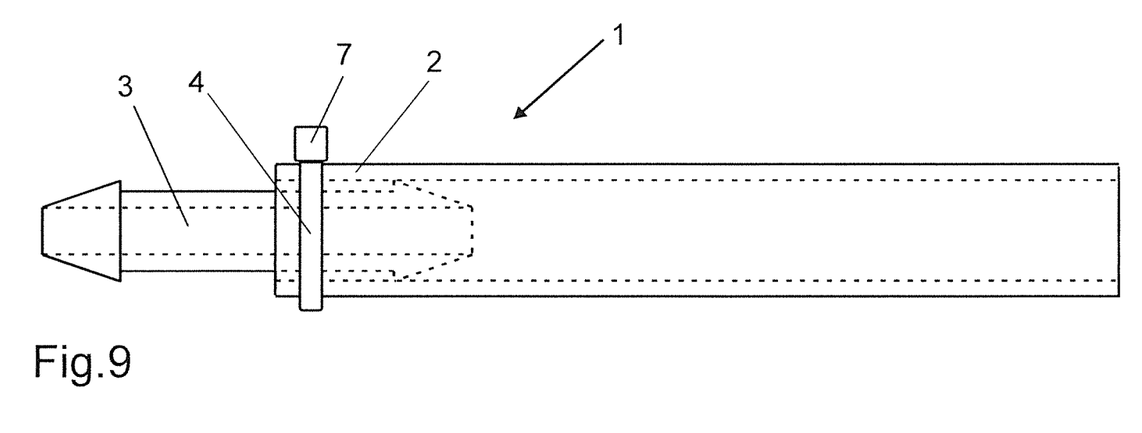
Figure 10:
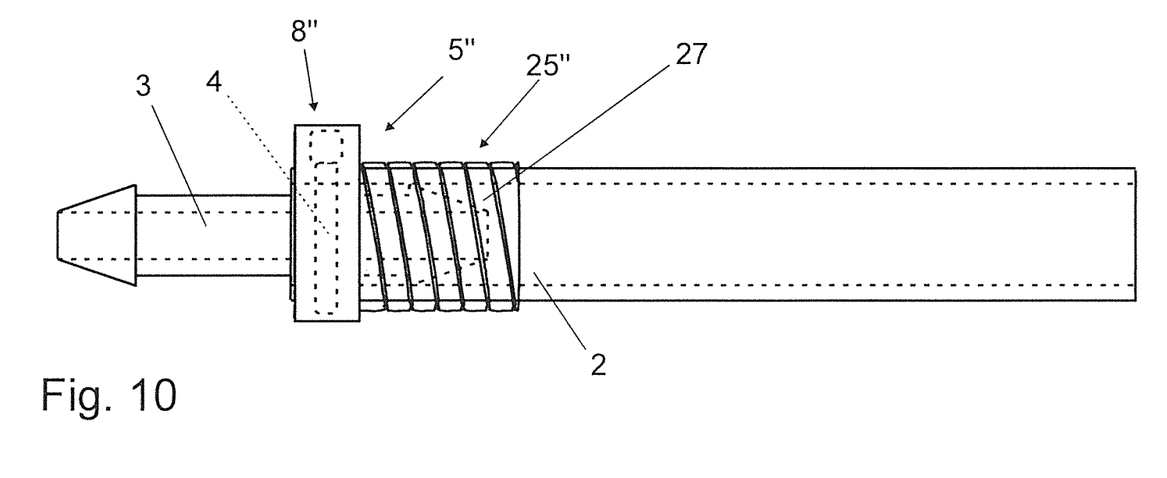
Figure 11:
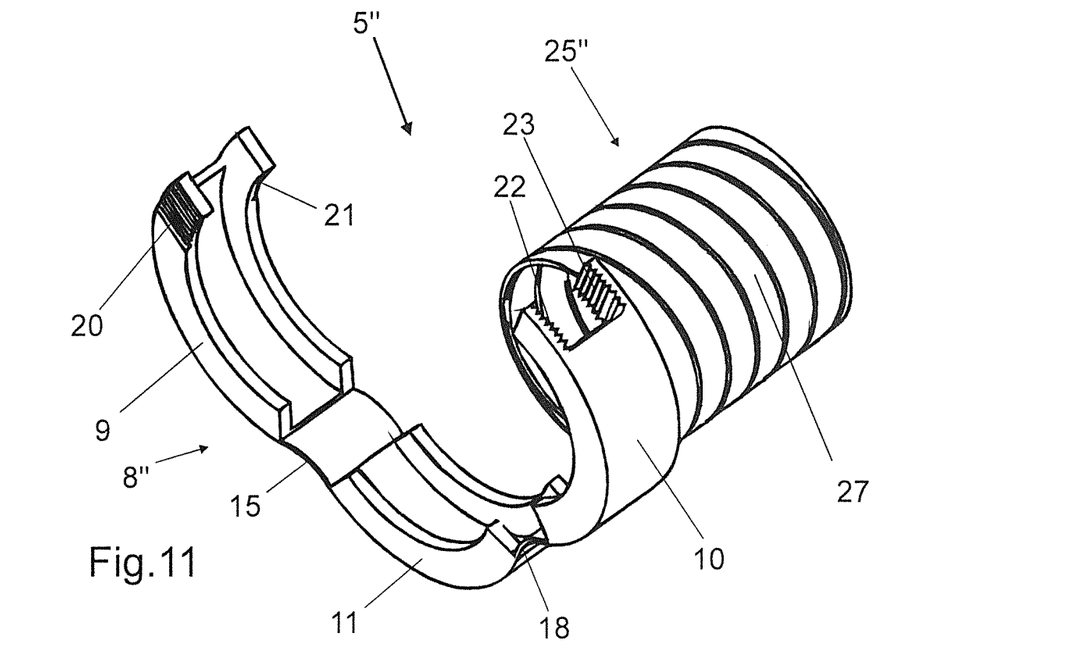
Figure 12:
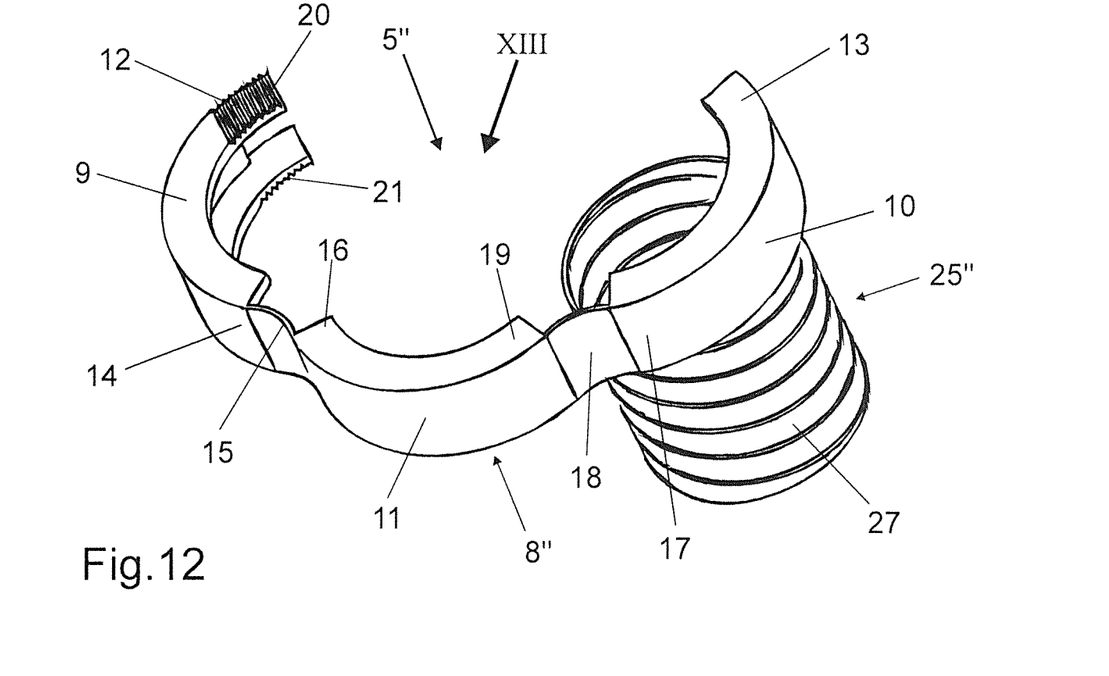
Figure 13:
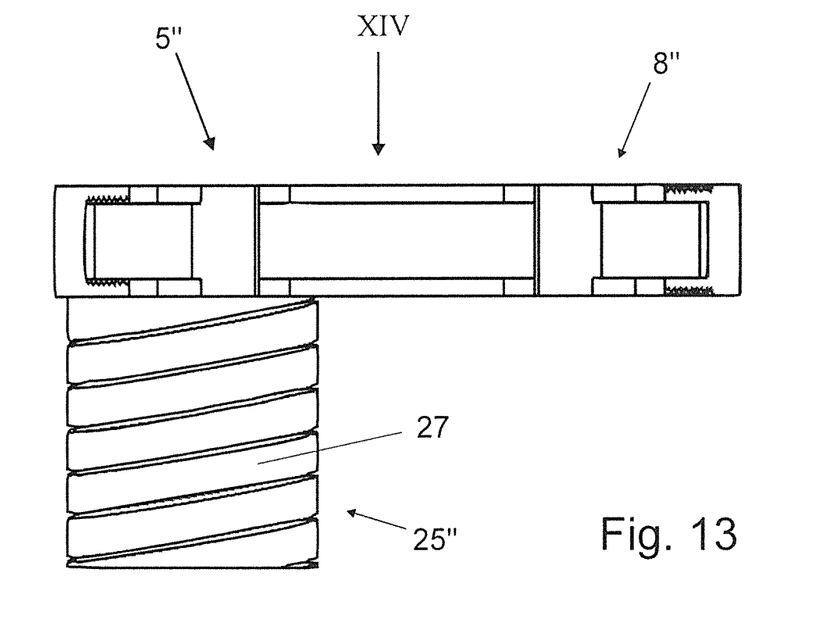
Figure 14:
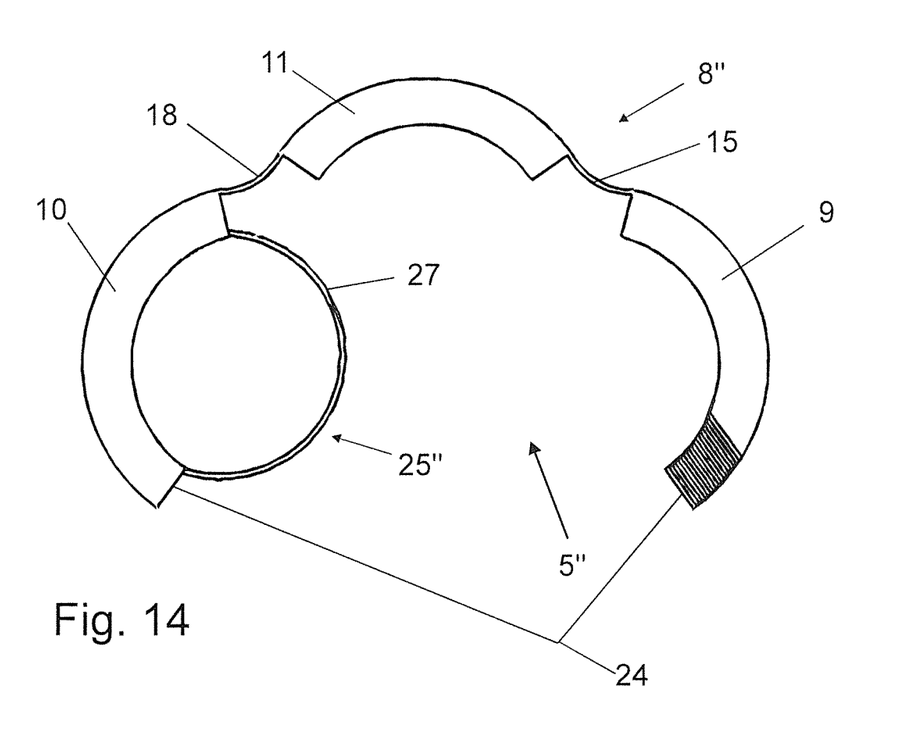

A hose coupling 1 is essentially comprised of a hose end 2, a hose connection 3, a hose clip 4 and a protective device 5.

To manufacture the hose connection, the hose end 2 of a hose 6 is fitted onto the hose connection 3 and connected in a sealing manner via the hose clip 4 in a known way.

The hose clip 4 is designed as a single-ear clamp, as known to a person skilled in the art, for example from U.S. Pat. No. 2,614,304 A and from DE 600 19 108 T2. To install the hose clip 4, it is clamped via its clamping device 7, for example a bridge section that is plastically deformable into a loop or "ear." In principle, hose clips that are tensionable via screws may also be used.

Figure 3:
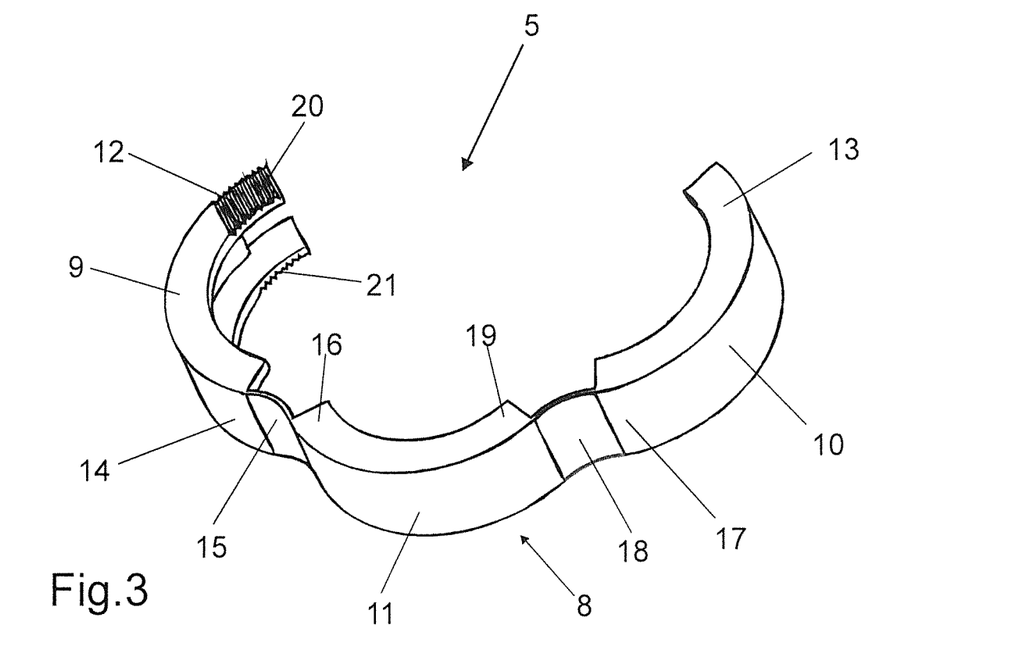
Figure 4:
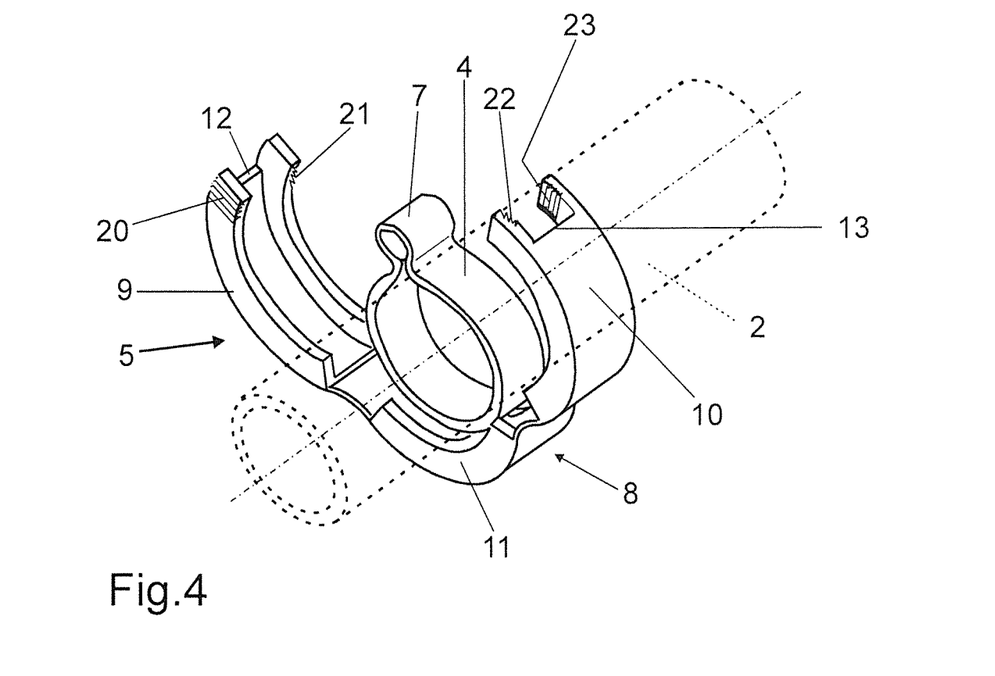

The protective device 5 essentially consists of a protective body 8 made of plastic, which, in the assembled state, surrounds a hose clip (4) around the circumference thereof and accommodates same at least in its clamping region via a radially extending moulding (32), and covers the hose clip (4) over the width thereof extending in the longitudinal direction of the hose connection (3). In the exemplary embodiments, the protective body 8 comprises a first ring segment 9 and a second ring segment 10, which are connected to one another via an adjacent third ring segment 11. The first ring segment 9 has a free end 12, and the second ring segment 10 has a free end 13. At its end 14 facing away from the free end 12 the first ring segment 9 is connected to an adjacent end 16 via a flexible thin section 15. At its end 17 facing away from the free end 13, the second ring segment 10 is connected to an adjacent end 19 of the third ring segment 11 via a flexible thin section 18.

At its free end 12 the first ring segment 9 has first externally located latching elements 20, 21. Similarly, at its free end 13 the second ring segment 10 has corresponding second internally located latching elements 22, 23. The first latching elements 20, 21 together with the corresponding second latching elements 22, 23 form a catch mechanism 24.

Figure 5:
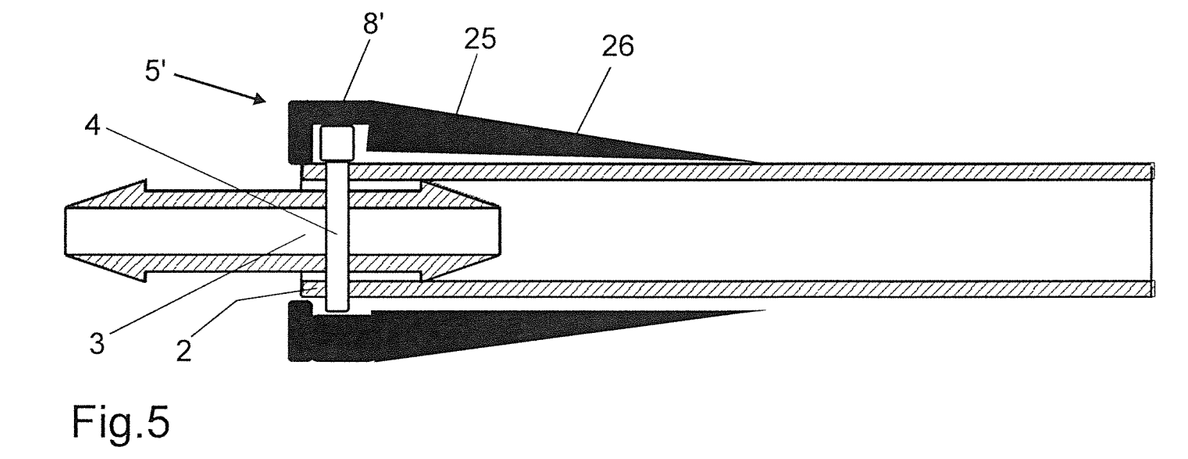
Figure 6:
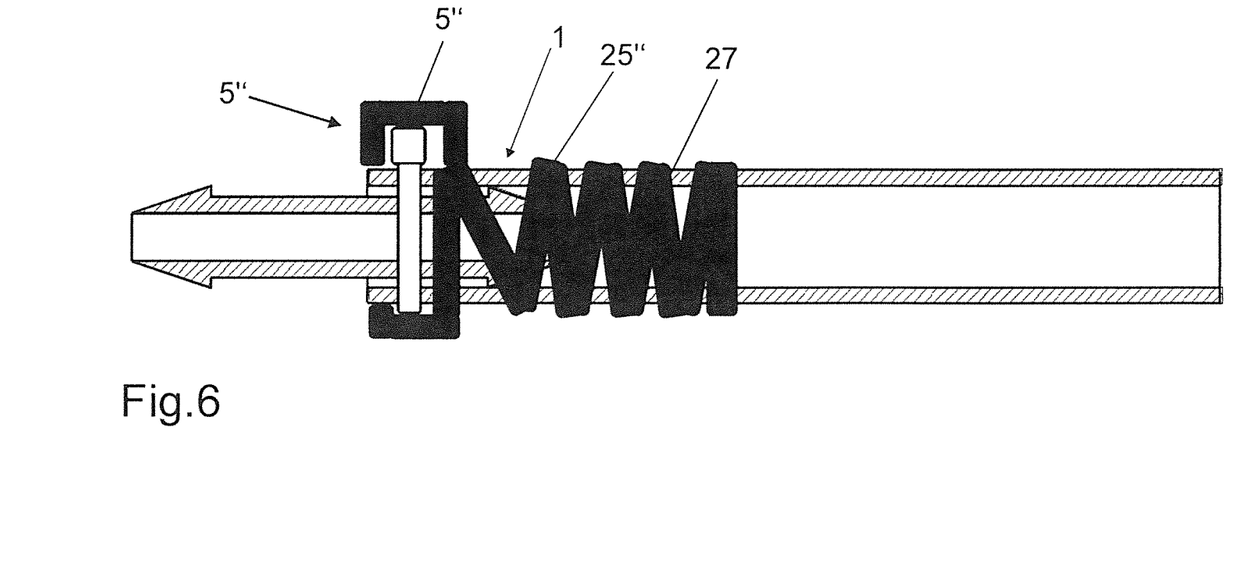

Corresponding to the exemplary embodiment of FIG. 5, the protective device 5' has a protective body 8', which on the side thereof facing away from the hose connection 3 has a kink protection 25 designed as an overlapping element for accommodating a portion of the hose 6. The kink protection 25 is configured as a cone 26 tapered in the direction away from the protective body.

Corresponding to the exemplary embodiments of FIGS. 6, 10, 11, 12, 13, 14, the protective device 5" has a protective body 8" with a kink protection 25" that is designed as a coil 27 directed away from the protective body 8".

Figure 7:
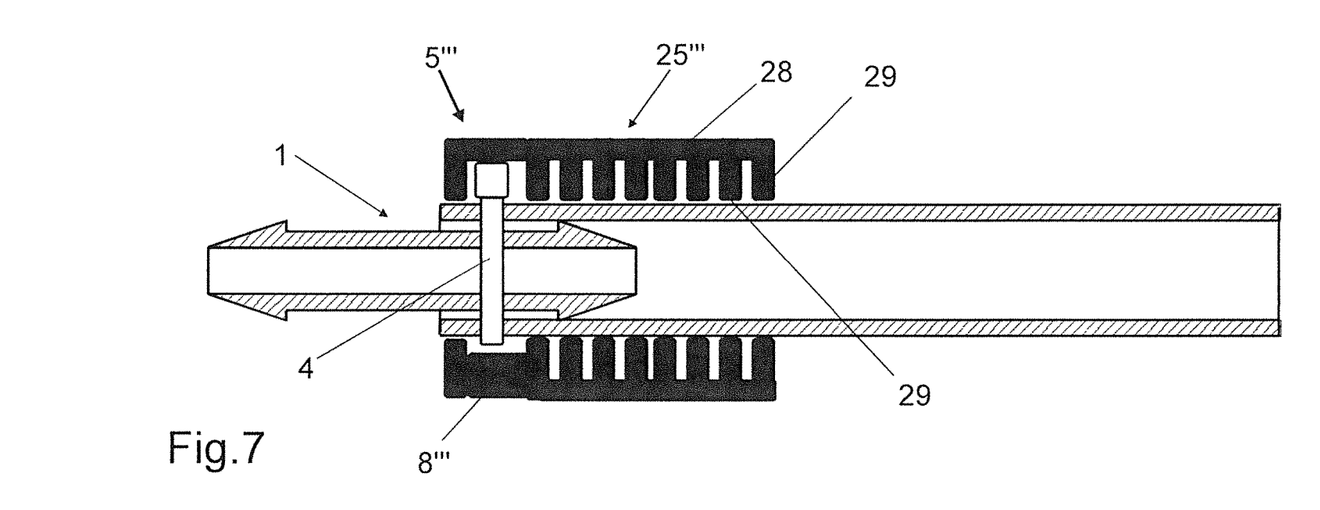

Corresponding to the exemplary embodiment of FIG. 7, the protective device 5''' has a protective body 8''' the kink protection 25''' of which is formed as a cylinder 28 that is directed away from the protective body 8''' and that has radially inward-directed annular ribs 29.

Figure 8:
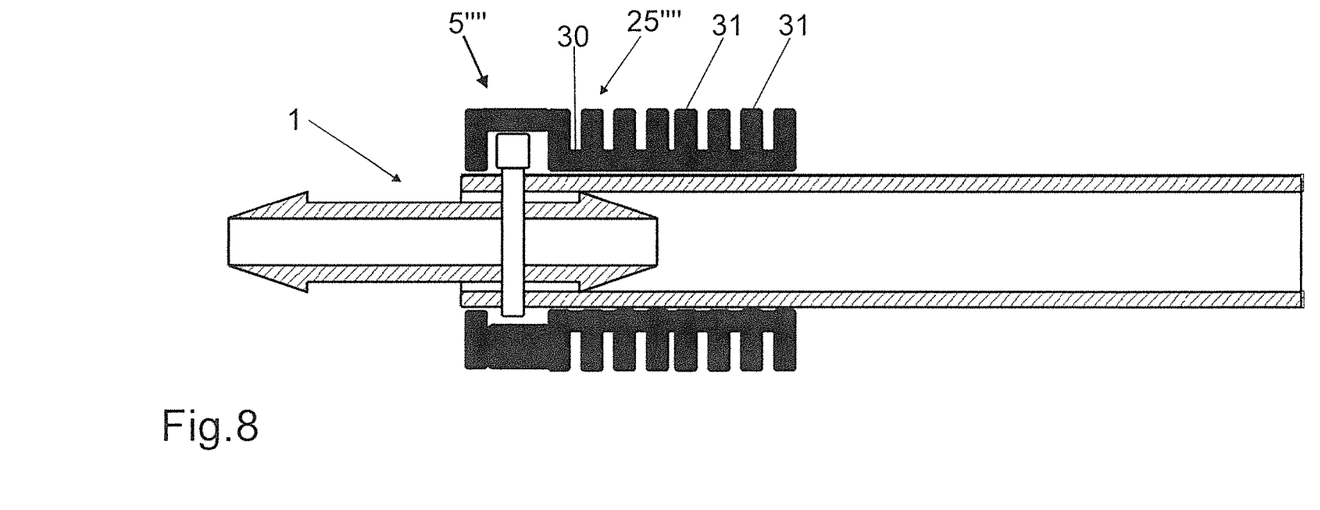

Corresponding to the exemplary embodiment of FIG. 8, the protective device 5'''' has a kink protection 25'''' with a cylinder 30 that is directed away from the protective body 8'''' and that has radially outward-directed annular ribs 31.

Of course, the embodiments discussed in the specific description and shown in the figures are merely illustrative exemplary embodiments of the present invention. In light of this disclosure, a person skilled in the art is given a wide range of possible variations.

In particular, the kink protection 25 can in each case be connected to one of the ring segments 9, 10, 11. Moreover, it is also possible to spread the kink protection 25, 25''', 25'''' and connect it to the ring segments 9, 10, 11.

LIST OF REFERENCE NUMBERS

1 hose coupling
2 hose end of 6

3 hose connection
4 hose clip
5, 5', 5", 5'", 5"" protective device
6 hose
7 clamping device
8, 8', 8", 8'", 8"" protective body
9 first ring segment of 8
10 second ring segment of 8
11 third ring segment of 8
12 free end of 9
13 free end of 10
14 end of 9
15 flexible thin section of 8
16 end of 11
17 end of 10
18 flexible thin section of 8
19 end of 11
20 first latching element of 12
21 first latching element of 12
22 second latching element of 13
23 second latching element of 13
24 catch mechanism
25, 25", 25'", 25"" kink protection
26 cone of 25
27 coil of 25"
28 cylinder of 25'"
29 rib of 28
30 cylinder of 25""
31 rib of 30
32 moulding of 8

The invention claimed is:

1. A protective device (5) for a hose clip (4), the hose clip (4) having a clamping device (7) that defines a clamping region of the hose clip (4) via which a hose end (2) can be connected to a hose connection (3), the protective device comprising:
a protective body (8, 8', 8", 8'", 8"") made of a plastic and being assemblable to the hose clip (4) so that, in an assembled state, the protective body (8) surrounds the hose clip (4) around a circumference thereof and accommodates the hose clip (4) at least in the clamping region thereof via a radially oriented moulding (32), the moulding covering the hose clip (4) over a width of the hose clip (4) extending in a longitudinal direction of the hose connection (3), the protective body (8, 8', 8", 8'", 8"") including:
a stiff intermediate ring segment (11) with opposite first and second circumferential ends;
a first flexible section (15) at the first circumferential end of the stiff intermediate ring segment (11);
a first stiff terminal ring segment (9) having a first articulated end (14) movably connected to the first flexible section (15) and a first free end (12) opposite the first articulated end (14);
a second flexible section (18) at the second circumferential end of the stiff intermediate ring segment (11); and
a second stiff terminal ring segment (10) having a second articulated end (17) movably connected to the second flexible section (18) and a second free end (13) opposite the second articulated end (17), wherein
the first free end (12) of the first stiff ring segment (9) is connectable to the second free end (13) of the second stiff ring segment (10).

2. The protective device of claim 1, wherein the first free end (12) of the first stiff ring segment (9) has a first latching element (20, 21) and the second free end (13) of the second stiff ring element (10) has a second latching element (22, 23), the first and second latching elements (20, 21, 22, 23) being engageable with one another to form a latch mechanism (24).

3. The protective device of claim 1, wherein the protective body (8', 8", 8'", 8"") has, at least on a side thereof that is facing away from the hose connection (3), a kink protection (25, 25", 25'", 25"") formed as an overlapping element to accommodate a portion of the hose (6).

4. The protective device of claim 3, wherein the kink protection (25"") comprises a cylinder (30) that is directed away from the protective body (8"") and that has radially outward-directed annular ribs (31).

5. A connection assembly for connecting a hose end (2) on a hose connection (3), the connection assembly comprising:
a hose clip (4) having a clamping device (7) configured for clamping the hose end (2) on the hose connection (3); and
a protective body (8, 8', 8", 8'", 8"") made of a plastic and being assemblable to the hose clip (4) so that, in an assembled state, the protective body (8) surrounds the hose clip (4) around a circumference thereof and accommodates the hose clip (4) at least in the clamping region thereof via a radially oriented moulding (32), the moulding covering the hose clip (4) over a width of the hose clip (4) extending in a longitudinal direction of the hose connection (3), the protective body (8, 8', 8", 8'", 8"") including:
a stiff intermediate ring segment (11) with opposite first and second circumferential ends;
a first flexible section (15) at the first circumferential end of the stiff intermediate ring segment (11);
a first stiff terminal ring segment (9) having a first articulated end (14) movably connected to the first flexible section (15) and a first free end (12) opposite the first articulated end (14);
a second flexible section (18) at the second circumferential end of the stiff intermediate ring segment (11); and
a second stiff terminal ring segment (10) having a second articulated end (17) movably connected to the second flexible section (18) and a second free end (13) opposite the second articulated end (17), wherein
the first free end (12) of the first stiff ring segment (9) is connectable to the second free end (13) of the second stiff ring segment (10).

* * * * *